(12) United States Patent
Lin et al.

(10) Patent No.: US 11,729,696 B2
(45) Date of Patent: Aug. 15, 2023

(54) ROBUST MULTIPATH ROUTING METHODS IN WIRELESS NETWORK

(71) Applicant: Carrier Corporation, Palm Beach Gardens, FL (US)

(72) Inventors: Chih-Kuang Lin, Dublin (IE); Adam Kuenzi, Silverton, OR (US); Michael Lang, Oregon City, OR (US); Ankit Tiwari, South Windsor, CT (US); Davide Villa, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 126 days.

(21) Appl. No.: 16/973,376

(22) PCT Filed: Nov. 7, 2019

(86) PCT No.: PCT/US2019/060177
§ 371 (c)(1),
(2) Date: Dec. 8, 2020

(87) PCT Pub. No.: WO2020/106457
PCT Pub. Date: May 28, 2020

(65) Prior Publication Data
US 2021/0274419 A1    Sep. 2, 2021

Related U.S. Application Data

(60) Provisional application No. 62/769,660, filed on Nov. 20, 2018.

(51) Int. Cl.
H04W 40/12    (2009.01)
H04W 40/10    (2009.01)
(Continued)

(52) U.S. Cl.
CPC .......... *H04W 40/12* (2013.01); *H04W 40/10* (2013.01); *H04W 40/34* (2013.01); *H04W 40/023* (2013.01)

(58) Field of Classification Search
None
See application file for complete search history.

(56) References Cited

U.S. PATENT DOCUMENTS 6,973,039 B2   12/2005   Redi et al.
7,161,926 B2   1/2007    Elson et al.
(Continued)

FOREIGN PATENT DOCUMENTS

CN   107393069 A   11/2017
KR   101085687 B1  11/2011

OTHER PUBLICATIONS

Chakrabarti, S. et al. "QoS issues in ad hoc wireless networks." IEEE communications magazine 39.2 (2001): 142-148.
(Continued)

*Primary Examiner* — Brian S Roberts
(74) *Attorney, Agent, or Firm* — Cantor Colburn LLP

(57) ABSTRACT

A method of operating an access control system including a plurality of access controls each operating as a node including: receiving a node information from one or more nodes of the access control system, the one or more nodes including an origination node and a destination node; determining one or more routes between the origination node and the destination node in response to the node information or a minimum hop distance between the originating node and the head node and a minimum hop distance between any intermediate routing node and the head node; receiving a reroute message indicating a failed node between the destination node and the origination node; and determining an alternate
(Continued)

path from the origination node to the destination node around the failed node in response to the one or more routes.

20 Claims, 3 Drawing Sheets

(51) Int. Cl.
*H04W 40/34* (2009.01)
*H04W 40/02* (2009.01)

(56) References Cited

U.S. PATENT DOCUMENTS

| | | | |
|---|---|---|---|
| 7,315,548 B2 | 1/2008 | Joshi | |
| 7,706,282 B2 | 4/2010 | Huang | |
| 7,924,758 B2 | 4/2011 | Park et al. | |
| 7,975,069 B2 | 7/2011 | Lee et al. | |
| 8,351,339 B2 | 1/2013 | Zhen et al. | |
| 8,358,197 B2 | 1/2013 | Tran | |
| 8,374,092 B2 | 2/2013 | Previdi et al. | |
| 8,654,627 B2 | 2/2014 | Datz et al. | |
| 8,797,913 B2 | 8/2014 | Nandagopal et al. | |
| 8,953,441 B2 | 2/2015 | Nakil et al. | |
| 8,982,708 B1 | 3/2015 | McCabe et al. | |
| 9,030,939 B2 | 5/2015 | Hui et al. | |
| 9,232,458 B2 | 1/2016 | Vasseur et al. | |
| 9,413,643 B2 | 8/2016 | Hui et al. | |
| 9,794,808 B2 | 10/2017 | Baroudi et al. | |
| 2002/0101869 A1 | 8/2002 | Garcia-Luna-Aceves et al. | |
| 2005/0237950 A1* | 10/2005 | Yuan | H04J 14/0227 370/255 |
| 2007/0070909 A1* | 3/2007 | Reeve | H04L 45/28 370/238 |
| 2008/0159151 A1* | 7/2008 | Datz | H04L 45/28 370/238 |
| 2008/0205355 A1* | 8/2008 | Liu | H04L 45/12 370/254 |
| 2009/0010153 A1* | 1/2009 | Filsfils | H04L 45/28 370/218 |
| 2009/0010189 A1* | 1/2009 | Nagra | H04W 40/10 370/311 |
| 2009/0225652 A1* | 9/2009 | Vasseur | H04L 41/0677 370/225 |
| 2009/0228575 A1* | 9/2009 | Thubert | H04L 45/64 709/220 |
| 2009/0296704 A1 | 12/2009 | Km et al. | |
| 2010/0220653 A1 | 9/2010 | Hwang et al. | |
| 2018/0109439 A1* | 4/2018 | Chen | H04L 45/124 |
| 2018/0241636 A1 | 8/2018 | Zhang | |
| 2019/0141500 A1 | 5/2019 | Kuenzi et al. | |
| 2019/0141616 A1 | 5/2019 | Kuenzi et al. | |

OTHER PUBLICATIONS

Dai, F. et al. "A highly reliable multi-path routing scheme for ad hoc wireless networks", The International Journal of Parallel, Emergent and Distributed Systems, vol. 00, No. 0, 2005, 16 Pages.

Ganesan, D. et al. "Highly-Resilient, Energy-Efficient Multipath Routing in Wireless Sensor Networks", Mobile Computing and Communications Review, vol. 5, No. 4, Oct. 2001, pp. 10-24.

Hwang, Y., et al. "An adaptive routing protocol for ad-hoc networks using multiple disjoint paths." IEEE VTS 53rd Vehicular Technology Conference, Spring 2001. Proceedings (Cat. No. 01CH37202). vol. 3. IEEE, 2001. (pp. 2249-2253).

International Search Report and Written Opinion for International Application No. PCT/US2019/060177; International Filing Date Nov. 7, 2019; Report dated Feb. 20, 2020 (pp. 1-15).

Manocha, R.K. et al. "A Novel Cross-layer Node-Disjoint Multipath Routing Protocol for Ad Hoc Networks", International Journal of Computer Applications (0975-8887), vol. 66—No. 12, Mar. 2013, 13 Pages.

Sengul, C. et al. "Bypass Routing: An On-Demand Local Recovery Protocol for Ad Hoc Networks", University of Illinois at Urbana Champaign, 2006, Retrieved from http://mobius.cs.illinois.edu/system/files/medhocnet04.pdf, 13 Pages.

* cited by examiner

ROBUST MULTIPATH ROUTING METHODS IN WIRELESS NETWORK

CROSS REFERENCE TO RELATED APPLICATIONS

This application is a US National Stage of International Application No. PCT/US2019/060177 filed on 7 Nov. 2019, which claims the benefit of U.S. Provisional Application No. 62/769,660, filed on 20 Nov. 2018, which is are incorporated herein by reference in their entirety.

BACKGROUND

The subject matter disclosed herein generally relates to the field of access control systems, and more particularly to an apparatus and method for communication between access controls of access control systems.

Access controls may be utilized to control access to specific entry point, such as, for example a lock on a door. Access controls may be wireless operating on an energy storage device (e.g., a battery) and energy within each access control is may be closely monitored. A failed access control may inhibit the propagation of data amongst a plurality of access controls.

BRIEF SUMMARY

According to one embodiment, a method of operating an access control system including a plurality of access controls each operating as a node is provided. The method including: receiving a node information from one or more nodes of the access control system, the one or more nodes including an origination node and a destination node; determining one or more routes between the origination node and the destination node in response to the node information or a minimum hop distance between the originating node and the head node and a minimum hop distance between any intermediate routing node and the head node; receiving a reroute message indicating a failed node between the destination node and the origination node; and determining an alternate path from the origination node to the destination node around the failed node in response to the one or more routes.

In addition to one or more of the features described above, or as an alternative, further embodiments may include that determining an alternate path from the origination node to the destination node around the failed node in response to the one or more routes further includes: transmitting data along the alternate path from the origination node or one of the upstream nodes of failed node to the destination node.

In addition to one or more of the features described above, or as an alternative, further embodiments may include that determining an alternate path from the origination node to the destination node around the failed node in response to the one or more routes further includes: transmitting data to each of the one or more nodes located within a selected transmission range of the origination node or a node that detected the failed node.

In addition to one or more of the features described above, or as an alternative, further embodiments may include that the selected transmission range is one-hop or multiple hops.

In addition to one or more of the features described above, or as an alternative, further embodiments may include that each of the one or more nodes located within a selected transmission range of the origination node or a node of the one or more nodes that detected the failed node are configured to transmit the data within the selected transmission range to any of the of the one or more nodes on a route of the one or more routes between the failed node and the destination node.

In addition to one or more of the features described above, or as an alternative, further embodiments may include that the node information includes an energy metric.

In addition to one or more of the features described above, or as an alternative, further embodiments may include that the node information includes a latency metric.

In addition to one or more of the features described above, or as an alternative, further embodiments may include that the energy metric includes at least one of a state of charge of a power supply of each of the plurality of access controls, an energy cost scheduled of each of the plurality of access controls, and the energy consumption required to transfer data via each of the plurality access control.

In addition to one or more of the features described above, or as an alternative, further embodiments may include that the latency metric includes at least one of access delays of each of the plurality of access controls and transmission delays of each of the plurality of access controls.

In addition to one or more of the features described above, or as an alternative, further embodiments may include that origination node is a head node or any node in the network.

In addition to one or more of the features described above, or as an alternative, further embodiments may include that each of the one or more nodes are door locks.

In addition to one or more of the features described above, or as an alternative, further embodiments may include that determining an alternate path from the origination node to the destination node around the failed node in response to the one or more routes further includes: determining an alternate path from the origination node to the destination node around the failed node in response to the one or more routes and at least one of an energy metric and a latency metric.

In addition to one or more of the features described above, or as an alternative, further embodiments may include: determining one or more end-to-end routes between the head node and each of the one or more nodes in response to periodically transmitted node status updates transmitted from each of the one or more nodes.

In addition to one or more of the features described above, or as an alternative, further embodiments may include that the periodically transmitted node status updates include at least one of access control usage and access control energy status.

In addition to one or more of the features described above, or as an alternative, further embodiments may include: organizing the one or more routes between the origination node and the destination node into joint routes and disjoint routes.

In addition to one or more of the features described above, or as an alternative, further embodiments may include that determining an alternate path from the origination node to the destination node around the failed node in response to the one or more routes further includes: selecting one of the disjoint routes from the origination node, a node of the one or more nodes that is upstream of the failed node, or the head node that does not include the failed node to serve as an alternate path.

In addition to one or more of the features described above, or as an alternative, further embodiments may include: adjusting to the minimum hop distance and routing information of each of the one or more nodes in response to receiving a reroute message indicating the failed node between the destination node and the origination node.

In addition to one or more of the features described above, or as an alternative, further embodiments may include that determining an alternate path from the origination node to the destination node around the failed node in response to the one or more routes further includes: determining that the failed node is upstream of the origination node; and determining an alternate path using the minimum hop distance data to reroute data toward the head node.

According to another embodiment, an access control system having a plurality of access controls each operating as a node is provided. The access control including: a processor; and a memory including computer-executable instructions that, when executed by the processor, cause the processor to perform operations, the operations including: receiving a node information from one or more nodes of the access control system, the one or more nodes including an origination node, intermediate routing nodes and a destination node; determining one or more routes between the origination node and the destination node in response to the node information or a minimum hop distance between the originating node and the head node; receiving a reroute message indicating a failed node between the destination node and the origination node; and determining an alternate path from the origination node or any upstream node of failed node to the destination node around the failed node in response to the one or more routes.

In addition to one or more of the features described above, or as an alternative, further embodiments may include that determining an alternate path from the origination node to the destination node around the failed node in response to the one or more routes further includes: transmitting data along the alternate path from the origination node or any upstream node of failed node to the destination node.

Technical effects of embodiments of the present disclosure include detecting a failed node and routing data around the failed node using at least one of flooding data or data paths determined in response to energy metric, latency metric, and distance/hop metric of access controls of an access control system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
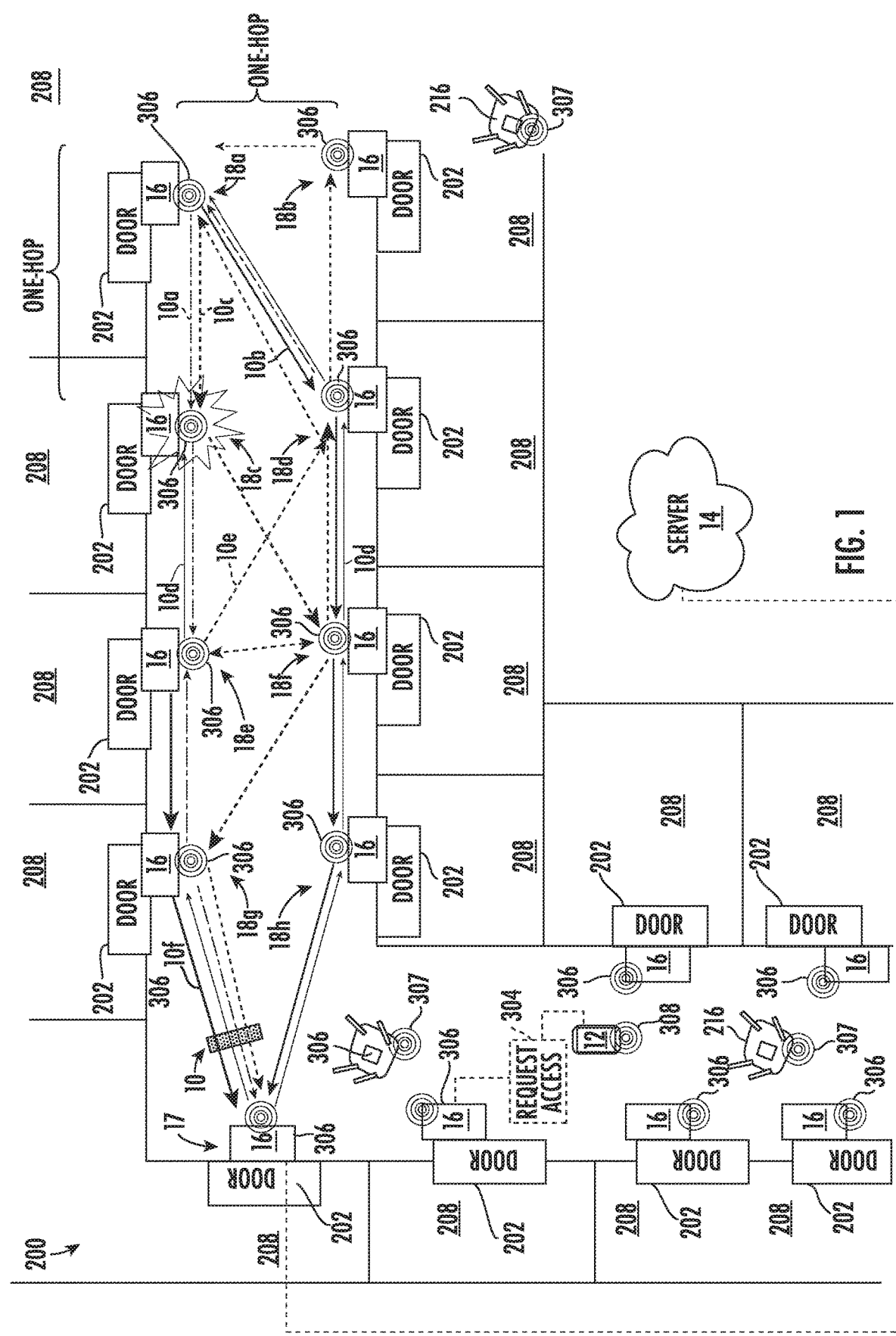
FIG. 1 illustrates a general schematic system diagram of an access control system, in accordance with an embodiment of the disclosure.

FIG. 1 schematically illustrates an access control system 200. The system 200 generally includes a mobile device 12, a server 14, a wireless access protocol device 216, and an access control 16. The access control system 200 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. The access control system 200 may include any number of doors 202 and rooms 208. Further, there may be multiple doors 202 and access controls 16 for each room 208. It is understood that while the access control system 200 utilizes a door 202 and room 208 system for exemplary illustration, embodiments disclosed herein may be applied to other access control systems such as, for example, elevators, turnstiles, safes, etc.

A mobile device 12 or physical key card 92 (see FIG. 2) belonging to an individual may be granted access to one or more access controls 16 (e.g. the door lock on an office or hotel room assigned to the individual). In one example, when an individual begins working at a new building their mobile device 12 or physical key card 92 will be granted access to particular rooms 208 where they are allowed to enter and/or work. In another example, when an individual checks into the hotel room their mobile device 12 or physical key card 92 will be granted access to a room 208. There may be one or more mobile devices 12 or physical key cards 92 assigned to a room 208 (e.g. a husband and a wife in a hotel; or multiple workers in a collaborative workspace). An individual may utilize their mobile device 12 or physical key card 92 to unlock and/or lock the access control 16 operably connected to their assigned room 208 through an access request 304. The mobile device 12 or physical key card 92 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. For example, the selected range may be manually set by an individual as a chosen range or automatically set based on the limitations of hardware associated with the mobile device 12 and/or the access control 16.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide data 10 including credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the access controls 16 receives credentials and other data. The access controls 16 may communicate with a head node 17, through the wireless access protocol devices 216, or through the mobile device 12.

The access control 16 may be configured to continuously advertise a wireless signal 306 for positional data of the mobile device 12. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine positional data of the mobile device 12 in response to a signal strength of the wireless signal 306. The positional data of the mobile device 12 may help determine which access control 16 is located proximate the mobile device 12, and thus which access control 16 the mobile device 12 desires to enter.

Positional data of the mobile device 12 may also be determined using the wireless access protocol device 216. The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and determine a positional data of the mobile device 12 in response to a signal strength of the wireless signal 307.

Positional data of the mobile device 12 may also be determined using the wireless access protocol device 216 and/or the access controls 16 to detect a wireless signal 308 advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and determine a positional data of the mobile device 12 in response to a signal strength of the wireless signal 308.

Wireless signal interaction data between the mobile device 12 and at least one of the access device 16 and the wireless access protocol device 216 may transmitted to the server 14 to determine positional data. The server 14 may use signal strength detected between the mobile device 12, access controls 16, and the wireless access protocol device 216 to determine positional data of the mobile device 12.

Each access control 216 within the access control system 200 may be referred to as a "node" 18a-18h, 17 within the access control system 216. The access control system 200 may include a head node 17 that controls the propagation of data through the access control system 200. The head node 17 may be one of the access controls 16 or may be a dedicated control device, which is equipped with more computation and communication powers. The head node 17 may be in electronic communication with the server 14 or the internet. The access control system 200 comprises a plurality of access controls 16 (i.e., nodes) and a head node 17 to form a multi-hop mesh network. In this multi-hop mesh network, the communication between any pair of nodes 18a-18h may be a single hop transmission or a multi-hop transmission.

For example, using the first node 18a as an example, the first node 18a can send a message addressed to the head node 17 without knowing any routing information, rather the first node 18a just needs to know its own hop distance and a hop distance of nearby nodes. The hop distance may represent the number of hops from a node 18a-18h to the head node 17. In an embodiment, each node 18a-18h transmits its hop distance in a Bluetooth advertisement to nearby neighboring nodes. Upstream is determined by a node by scanning to find neighboring nodes that have a smaller hop distance than the node. Downstream is determined by a node by scanning to find neighboring nodes that have a greater hop distance than the node. In this example the first node 18a sends the message to the head node 17 to a neighbor node with a smaller hop distance and this process continues until the message finds its way to the head node 17. Along the way, each node 18b-18h can record which downstream node 18a-18h the message came from, and can remember then that any future messages addressed to the first node 18a (i.e., the originating node) could be sent back downstream using the route information recorded from the first message.

Data 10 may be propagated from one access control 16 to another. The head node 17 and every node 18a-18h may undergo an initialization process in order to determine a hop-distance for each node 18a-18h. During the initialization process, the head node 17 and every node 18a-18h first derive their minimum hop distances toward head node 17. By default, the head node 17 sets its hop distance to zero. The minimum hop distance toward head node 17 denotes the minimum number of intermediate hops between an initiating node (18a-18h) and head node 17. The one-hop transmission distance is decided by communication resource and hardware capability. Thus, the single hop transmission may mean that the data 10 (e.g., the energy metric) only transfers between two access controls 16, such as, for example, between the first node 18a and the third node 18c or between the first node 18a and the second node 18b. In an example, a two hop transmission may mean that the data 10 travels from the node 18a to the node 18c and then arrives at the node 18e. In this example using FIG. 1, node 18c and node 18e are upstream nodes of node 18a, and node 18a is a downstream node of node 18c. To enable all of the nodes, 18a-18h, that derive their minimum hop distances toward head node 17, every node 18a-18h broadcasts a message with its minimum hop distance toward head node 17 to its neighbors. Each neighbor is able to set its hop distance toward head node 17 by identifying the smallest nearby hop distance from its neighbors and adding 1. In addition, the head node 17 and every node 18a-18h creates an one-hop neighbor table, which records one-hop neighbors ID and MAC address, their receive signal strengths and the minimum hop distances toward head node 17, energy metric, or latency metric, using received broadcast messages from other nodes. The broadcast process for the minimum hop distance toward head node and one-hop neighbor table creation is controlled by pre-defined timers which guarantee successful completions of the both tasks. The initialization process leads all of the nodes 18a-18h, 17 to learn their one-hop neighbors and their relevant information.

Each node 18a-18h may periodically transmit node information that includes the energy metric and the latency metric to one or more surrounding nodes within a one-hop distance and the one or more surrounding nodes may then propagate the node information to the head node 17. The nodes 18a-18h may transmit the node information via a wireless signal 306. In an embodiment, the wireless signal is Bluetooth.

The energy metric may include at least one of a state of charge of the power supply 34 (see FIG. 2) of the specific node, the energy cost scheduled, and the energy consumption required to transfer data. In an embodiment, the power supply 34 may be a battery system. The state of charge is the remaining energy (e.g., electrical power) within the power supply 34. The energy cost scheduled, is the amount of electrical power within the power supply 34 that the access 16 has already scheduled. For example, the specific node 18a-18g may already have software updates scheduled to share or daily notifications. The head node 17 may be configured to send control signals to the nodes 18a-18g in a periodical or Ad hoc way. The energy power consumption required to transfer data 10 is the electric power required from the power supply 34 to transfer data.

The latency metric may include at least one of access delays and transmission delays. The access delay depicts how long it may take a node 18a-18h to connect with another node. The access delay may be specific to the wireless connection speeds between two specific nodes or may be a general wireless connections speed of a node. The access delay may be a function of advertisement parameters of the node, scan parameters of the node, and traffic conditions of the nearby nodes. The advertisement of the nodes is the projecting step in connecting to another node. For example, the first node 18a advertises a wireless single 306 for another node (e.g., the second node 18b) to receive it and respond. The scan parameter is the receiving step in connecting to another node. For example, the first node 18a is scanning for advertisements of other node 18 (e.g., the second node 18b). The traffic condition of nearby node affects the access delay because of advertisement channel contention and busy state of the receiving nodes. For example, the advertisement channel contention occurs when the first node 18a advertises a wireless signal 306 while the second node 18b also advertises a wireless signal 306. Therefore, the third node 18c that is in scan mode will not successfully receive the wireless signal 306 from either the first node 18a or the second node 18b. The access delay caused by the busy state of the receiving node (e.g., the third node 18c) occurs when two nodes 18a and 18b are both in scan mode or data communication mode and no one will advertise a wireless signal 306 for the other nodes to receive it and respond. The transmission delay depicts how long it may take a node to transmit data 10 to another node. The transmission delay may be specific to the wireless transmission speeds between two specific nodes or may be a general wireless transmission speed of a node. In addition, the transmission delay is dependent on wireless link quality, and it is a function of data channel contention and interference. For example, two nodes set up a connection and start their data 10 transmissions using a specific channel. Meanwhile, there are ongoing data 10 transmissions in other local nodes using the same channel, leading to degraded transmission reliability and higher data 10 packet delay. The number of intermediate hops between the node and server 14 also has direct impacts on total transmission delay.

During the node information transmission, only new updated data 10 may be transmitted, thus reducing traffic in network. The node information that includes the energy metric and the latency metric may be limited to flood in a certain area or forwarded to head node 17. For example, the first node 18a may only send node information to its one-hop node neighbors. This is selected to achieve the balance between extra traffic overhead and energy-aware communication. The node information is also possible to be forwarded to the head node 17 because latency-constrained network communication is required, as explained further below.

The head node 17 and/or the server 14 may utilize the energy metric and the latency metric of the node information to determine a data 10 route to transmit data 10 throughout the nodes 18a-18h. In one example, the server 14 may utilize the energy metric and the latency metric of the node information to determine a data 10 route to transmit data 10 throughout the nodes 18a-18h and then transmit the data 10 route to the head node 17. In another example, the head node 17 may utilize the energy metric and the latency metric of the node information to determine a data 10 route to transmit data 10 throughout the nodes 18a-18h. The head node 17 and/or the server 14 may determine an energy-constrained route and/or a latency-constrained route. The energy constrained route will prioritize conservation of energy, such that data 10 will be transferred between node 18a-18h utilizing the least amount of energy or the route with the most balanced energy metric. The latency-constrained route will prioritize end-to-end packet delay, such that data 10 will be transferred between the nodes 18a-18h along the fastest route or a route that meets the end-to-end packet delay requirement.

Multiple end-to-end routes through the mesh network back to a downstream node may be iteratively derived in response to periodically transmitted node status updates from each of the nodes 18a-18h. The end-to-end routes exist between the head node and each of the nodes 18a-18h. Over time, as status updates are sent by a node (e.g. 18a) and as the messages are transmitted through the mesh upstream towards the head node 17, the messages may traverse different routes depending on availability of upstream nodes and how many potential routes are available based on the next hop distance in the route. Over time, many different upstream nodes will have recorded downstream routing information for reaching the node (e.g. 18a). These node status updates may include but is not limited to access control usage, access control energy status, etc.

Routes may be joint or disjoint. Joint routes refer to the scenario where one or more common intermediate nodes are shared by different routes. For the joint route node selection, it may be in compliance with the hop/distance, energy and latency guideline. For joint routes, there is no restriction about the shared intermediate nodes between routes. Disjoint routes mean that there is no common intermediate node shared by different routes. Therefore, disjoint routes may be used as alternative routes in the event of a node failure and message routing failure and the recovery performance is guaranteed given a node failure. Disjoint routes may be designed in pairs, triplets, etc, where any route in a group always has non-overlapped middle nodes. If a failed node occurs in a route, there is at least one alternative route without this failed node by selecting another route disjoint from the failed attempted route. To avoid a failed node in re-routing a message given a node failure, each routing node is required to record its downstream nodes for derived routes.

Multiple routes setup can be planned in the beginning of the mesh network by the head node 17 and each node 18a-18h may be configured with these planned routes. Or, derived disjoint routes may be dynamically created as described in the paragraphs above and in that case are not pre-determined by head node 17. Dynamic creation of disjoint routes can be ensured by when an initiator or a node selects a next upstream routing node in route request, the selected node will reject the route request if it already has a derived route for the initiator. This may require the initiator or node to select a different nearby node that does not already have a derived route for the initiating node. Such a way ensures the creation of disjoint routes.

For example, the first node 18a may transmit a first message along a first route 10a, a second message along a second route 10b different from the first route 10a, and a third route 10c different from the first route 10a and the second route 10b. The first route 10a and second route 10b, do not overlap over the same middle nodes to devise a path around a failed node in the future. As shown in FIG. 1, the first route 10a may go from the first node 18a to the third node 18c, from the third node 18c to the fifth node 18e, from the fifth node 18e to the seventh node 18g, and from the seventh node 18g to the head node 17. As shown in FIG. 1, the second route 10b may go from the first node 18a to the fourth node 18d, from the fourth node 18d to the sixth node 18f, from the sixth node 18f to the eighth node 18h, and from the eighth node 18h to the head node 17. As shown in FIG. 1, the third route 10c may go from the first node 18a to the third node 18c, from the third node 18c to the sixth node 18f, from the sixth node 18f to the seventh node 18g, and from the seventh node 18g to the head node 17. In this example, the first route 10a and second route 10b are disjoint while the first route 10a and the third route 10c are joint and the second route 10b and the third route 10c are joint.

The head node 17 may publish data 10 downstream from the head node 17 to the first node 18a. As shown by publishing paths 10d, in the example illustrated in FIG. 1, the third node 18c has failed. When the node 18c or any node has failed then a reroute message 10f may be transmitted back upstream to the head node 17 or to the next upstream nodes of node 18c from a node that detects the failed node. In the example illustrated in FIG. 1, the third node 18c has failed and the fifth node 18e detects that the third node 18c has failed when the fifth node 18e does not received confirmation that the third node 18c received the published data 10 along the publishing paths 10d from the fifth node 18e. The failures of the third node 18c interrupts the publishing path 10d that publishes data 10 from the head node 17 to the first node 18a. When a node is failed in downstream data 10 delivery (i.e., from the head node 17 to any other node 18a-h), two methods may be performed.

A first method to combat a failed node is to adopt managed flooding that bypass the failed node and reach any routing node between failed node and designated node in the route. For example, managed flooding may be shown by the managed flooding path 10e. When the data 10 fails via the published data path 10d at the fifth node 18e, the fifth node 18e then sends data 10 downstream to nodes with a one-hop transmission distance looking for a path around the failed node (i.e., third node 18c). For example, the fifth node 18e transmits data 10 from the fifth node 18e to the sixth node 18f and the fourth node 18d looking for a path around the third node 18c which has failed. Once the data 10 arrives at the fourth node 18d, then the fourth node 18d will then send data 10 downstream to nodes with a one-hop transmission distance looking for a path around the failed node (i.e., third node 18c). For example, the fourth node 18d transmits data 10 from the fourth node 18d to the second node 18b and the first node 18a looking for a path around the third node 18c to the first node 18a. The continuous one-hop transmission mentioned above is a broadcast flooding method, during which the number of times that a one-hop transmission is repeated prior to reaching a routing node between a failed node and a designated node in the route may be limited to reduce control overhead messages. Or, if the fourth node 18d has a disjoint path already recorded it may immediately know a path around the failed node 18c and send the message directly to 18b which could then send to 18a. After the initial node failure recovery is completed, upstream node 18e of failed node 18c sends a route update request in response to the failed node to head node 17 and origination node 18a. That notifies the relevant nodes 18a-18h, 17 about the failed node and avoids the use of routes with the failed node. An administrator can send a maintenance person to fix the failed node. Origination node may start a new route setup and avoid the failed node.

A second method to combat a failed node is to let an upstream node of failed node find an alternative route to the destination node and this route does not include the failed node. For example, node 18e detects node 18c failure and sends a re-route message 10f to upstream node 18g. The node 18g has two alternative disjoint routes toward node 18a in its routing table but the first route 10a and the third route 10c include the failed node (e.g., the third node 18c) and they cannot be chosen. Next, the seventh node 18g sends a re-route message 10f to upstream nodes (e.g., head node 17) and the head node 17 finds an alternative route 10b with no failed node (e.g., the third node 18c). The head node 17 uses this route to bypass the failed node (e.g., the third node 18c) and re-send data downstream towards the first node 18a (i.e., originating node). To avoid failed node in route selection, each routing node records its downstream nodes of derived route in each route setup. After the initial node failure recovery is completed, upstream node 18e of failed node 18c sends a route update request in response to the failed node to head node 17 and origination node 18a. That notifies the relevant nodes 18a-18h and 17 about the failed node and avoids the use of routes with the failed node. An administrator can send a maintenance person to fix the failed node. The origination node may start a new route setup and avoid the failed node. This second method may take a little bit more computational power from each node and increase failure recovery latency but it improves the protocol robustness and saves in transmission power.

For upstream data 10 delivery failure (i.e., from a node 18a-18h to the head node 17), the one-hop neighbors' hop data (i.e., the minimum hop distance toward head node 17) provides information to select an alternative upstream node to route to for bypassing a failed node and sending the data 10 to the head node 17. After the initial node failure recovery is completed, downstream node 18a of failed node 18c sends a route update request in response to the failed node to head node 17 and origination node 18a. That notifies the relevant nodes 18a-18h and 17 about the failed node and avoids the use of routes with the failed node. An administrator can send a maintenance person to fix the failed node. The origination node may start a new route setup and avoid the failed node.

Also, when a node failure occurs, it may affect the minimum hop distance data of its neighbors. The node which is affected calculates its minimal hop distance using the remaining neighbors' data 10. In addition, the node will update its routing table if the accuracy of routing information is affected by failed node. It will broadcast its new hop distance and routing table to neighbors if that is changed. Please note that node failure always introduces the extra packet latency and communication messages overhead. To minimize such a degradation, it is feasible to send test messages to assess route reliability and detect any node failure as soon as possible. In general, the proposed multipath routing method builds alternative routes between a node 18a-18h and head node 17 over time. As the network gets more matured, more different routes will be established so increasing the robustness of BLE mesh network routing.

Figure 2:
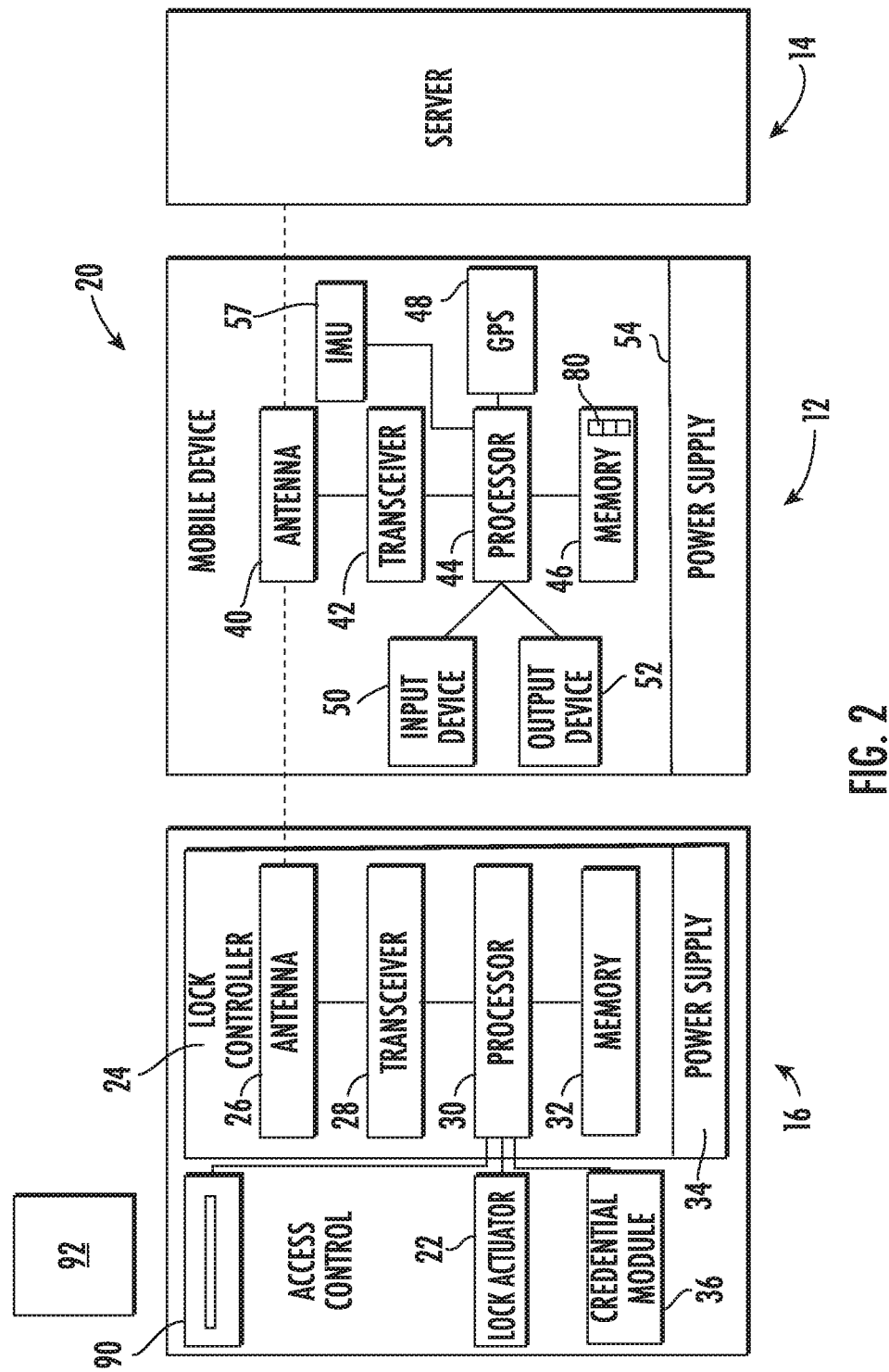
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components including but not limited to a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments, the credential module 36 may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an inertial measurement unit (IMU) sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

Figure 3:
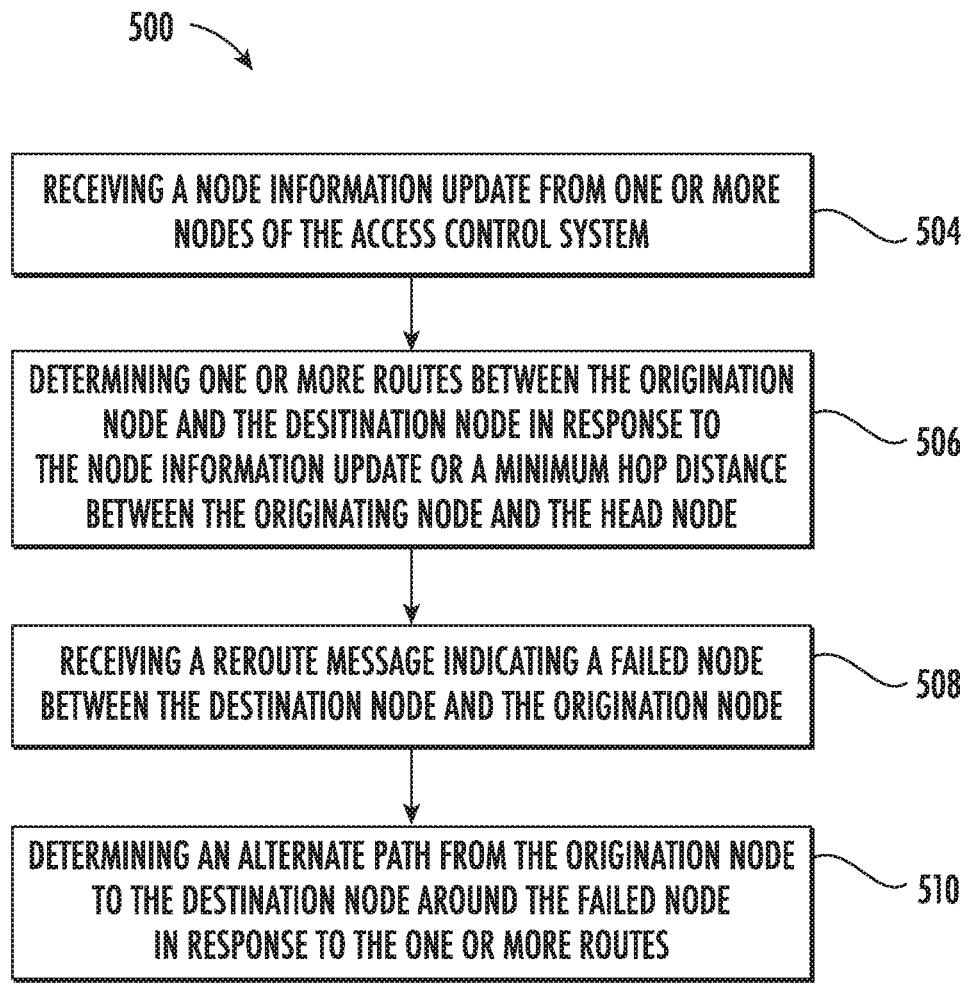
FIG. 3 is a flow diagram illustrating a method of operating an access control system comprising a plurality of access controls, according to an embodiment of the present disclosure.

Referring now to FIG. 3 with continued reference to FIGS. 1-2. FIG. 3 shows a flow chart of a method 500 of operating an access control system 200 comprising a plurality of access controls 16 each operating as a node 18a-18h, 17. In an embodiment, each of the plurality of access controls 16 are door locks.

At block 504, node information is received from one or more nodes 18a-18h, 17 of the access control system 200. The one or more nodes 18a-18h, 17 comprising an origination node and a destination node. Using the example shown in FIG. 1, the origination node may be the head node 17 and the destination node may be the first node 18a. Alternatively the origination node may be any node 18a-18h and the destination node may be any other node 18a-18h than the origination node. The node information may include an energy metric. The energy metric may include at least one of a state of charge of a power supply of each of the plurality of access controls 16, an energy cost scheduled of each of the plurality of access controls 16, and the energy consumption required to transfer data 10 via each of the plurality access control 16. The node information may include a latency metric. The latency metric may include at least one of access delays of each of the plurality of access controls 16 and transmission delays of each of the plurality of access controls 16.

At block 506, one or more routes between the origination node and the destination node are determined in response to the node information or a minimum hop distance between the originating node and the head node. The derived routes may be joint or disjoint routes with trade-off. At block 508, a reroute message 10f indicating a failed node between the destination node and the origination node is received in a downstream node failure case. Using the example shown in FIG. 1, the failed node may be the third node 18c. Alternatively, different downstream and upstream node failure recovery as described above. At block 510, an alternate path from the origination node to the destination node around the failed node is determined in response to the one or more routes.

The alternate path may be determined by either flooding data 10 around the failed node, following a predetermining route at a node 18a-18h upstream of the failed node or at the head node 17 or using the minimum hop distance data to manage an upstream node failure and transmitting data 10 along the alternate path from the origination node to the destination node. The process of flooding the data 10 around the failed node may include: transmitting data 10 to each of the one or more nodes located within a selected transmission range of the origination node or a node that detected the failed node. The selected transmission range may be one-hop or more hops and then each of the one or more nodes located within a selected transmission range of the origination node or the node that detected the failed node are configured to transmit the data 10 within the selected transmission range to the nodes on the derived route between the failed node and destination node. When the node on the derived route receives the data 10, it sends the data 10 to the destination node along the derived route. This way handles the failed node recovery and minimizes the control messages overhead from flooding. The process of using the minimum hop distance data to manage an upstream node failure is close to the hop-by-hop route setup with the shortest distance to head node but it avoids the failed node in the route setup.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an access control system comprising a plurality of access controls each operating as a node, the method comprising:
   receiving a node information from one or more nodes of the access control system, the one or more nodes comprising at least one of an origination node and a destination node;
   determining one or more routes between the origination node and the destination node in response to the node information or a minimum hop distance between the originating node and a head node and a minimum hop distance between any intermediate routing node and the head node;
   receiving a reroute message indicating a failed node between the destination node and the origination node; and
   determining an alternate path from the origination node to the destination node around the failed node in response to receiving the reroute message.

2. The method of claim 1, wherein determining an alternate path from the origination node to the destination node around the failed node in response to the one or more routes further comprises:
   transmitting data along the alternate path from the origination node or one of the upstream nodes of the failed node to the destination node.

3. The method of claim 1, wherein determining an alternate path from the origination node to the destination node around the failed node in response to the one or more routes further comprises:
transmitting data to each of the one or more nodes located within a selected transmission range of the origination node or a node that detected the failed node.

4. The method of claim 3, wherein the selected transmission range is one-hop or multiple hops.

5. The method of claim 3, wherein each of the one or more nodes located within a selected transmission range of the origination node or a node of the one or more nodes that detected the failed node are configured to transmit the data within the selected transmission range to any of the of the one or more nodes on a route of the one or more routes between the failed node and the destination node.

6. The method of claim 1, wherein the node information includes an energy metric.

7. The method of claim 6, wherein the energy metric includes at least one of a state of charge of a power supply of each of the plurality of access controls, an energy cost scheduled of each of the plurality of access controls, and the energy consumption required to transfer data via each of the plurality access control.

8. The method of claim 1, wherein the node information includes a latency metric.

9. The method of claim 8, wherein the latency metric includes at least one of access delays of each of the plurality of access controls and transmission delays of each of the plurality of access controls.

10. The method of claim 1, wherein origination node is a head node or any node in the network.

11. The method of claim 1, wherein each of the one or more nodes are door locks.

12. The method of claim 1, wherein determining an alternate path from the origination node to the destination node around the failed node in response to the one or more routes further comprises:
determining an alternate path from the origination node to the destination node around the failed node in response to the one or more routes and at least one of an energy metric and a latency metric.

13. The method of claim 1, further comprising:
determining one or more end-to-end routes between the head node and each of the one or more nodes in response to periodically transmitted node status updates transmitted from each of the one or more nodes.

14. The method of claim 13, wherein the periodically transmitted node status updates include at least one of access control usage and access control energy status.

15. The method of claim 1, further comprising:
organizing the one or more routes between the origination node and the destination node into one or more joint routes and one or more disjoint routes.

16. The method of claim 15, wherein determining an alternate path from the origination node to the destination node around the failed node in response to the one or more routes further comprises:
selecting one of the disjoint routes from the origination node, a node of the one or more nodes that is upstream of the failed node, or the head node that does not include the failed node to serve as an alternate path.

17. The method of claim 1, further comprising:
adjusting the minimum hop distance and routing information of each of the one or more nodes in response to receiving a reroute message indicating the failed node between the destination node and the origination node.

18. The method of claim 1, wherein determining an alternate path from the origination node to the destination node around the failed node in response to the one or more routes further comprises:
determining that the failed node is upstream of the origination node; and
determining an alternate path using a minimum hop distance data to reroute data toward the head node.

19. An access control system having a plurality of access controls each operating as a node, each access control comprising:
a processor; and
a memory comprising computer-executable instructions that, when executed by the processor, cause the processor to perform operations, the operations comprising:
receiving a node information from one or more nodes of the access control system, the one or more nodes comprising at least one of an origination node, intermediate routing nodes and a destination node;
determining one or more routes between the origination node and the destination node in response to the node information or a minimum hop distance between the originating node and a head node;
receiving a reroute message indicating a failed node between the destination node and the origination node; and
determining an alternate path from the origination node or any upstream node of the failed node to the destination node around the failed node in response to receiving the reroute message.

20. The access control system of claim 19, wherein determining an alternate path from the origination node to the destination node around the failed node in response to the one or more routes further comprises:
transmitting data along the alternate path from the origination node or any upstream node of the failed node to the destination node.

* * * * *